(12) United States Patent
Grandcolas et al.

(10) Patent No.: US 7,137,006 B1
(45) Date of Patent: Nov. 14, 2006

(54) METHOD AND SYSTEM FOR SINGLE SIGN-ON USER ACCESS TO MULTIPLE WEB SERVERS

(75) Inventors: Michael L. Grandcolas, Santa Monica, CA (US); France Law, Los Angeles, CA (US); Ashwin Doshi, Cerritos, CA (US); Michael Williams, Thousand Oaks, CA (US); Yeona Jang, Princeton, NJ (US); Toni Merschen, White Plains, NY (US); Jack Pan, Rowland Heights, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 796 days.

(21) Appl. No.: 09/668,112

(22) Filed: Sep. 22, 2000

Related U.S. Application Data

(60) Provisional application No. 60/155,853, filed on Sep. 24, 1999.

(51) Int. Cl.
*H04L 9/00* (2006.01)
(52) U.S. Cl. ................................ 713/180
(58) Field of Classification Search ............ 713/202
See application file for complete search history.

(56) References Cited

U.S. PATENT DOCUMENTS

| | | | | |
|---|---|---|---|---|
| 4,995,112 A | | 2/1991 | Aoyama | 380/25 |
| 5,241,594 A | * | 8/1993 | Kung | 713/151 |
| 5,671,354 A | | 9/1997 | Ito et al. | |
| 5,805,803 A | * | 9/1998 | Birrell et al. | 713/201 |
| 5,922,074 A | | 7/1999 | Richard et al. | |
| 5,991,810 A | * | 11/1999 | Shapiro et al. | 709/229 |
| 5,999,711 A | | 12/1999 | Misra et al. | 395/187.01 |
| 6,006,333 A | * | 12/1999 | Nielsen | 713/202 |
| 6,023,684 A | | 2/2000 | Pearson | 705/35 |
| 6,044,465 A | | 3/2000 | Dutcher et al. | 713/200 |
| 6,049,877 A | * | 4/2000 | White | 713/201 |

(Continued)

FOREIGN PATENT DOCUMENTS

EP  0 913 789 A2  5/1999

(Continued)

OTHER PUBLICATIONS

European Search Report for Application No. 00 20 3266, dated Jul. 15, 2002 (mailing date).

(Continued)

*Primary Examiner*—Ayaz Sheikh
*Assistant Examiner*—Pramila Parthasarathy
(74) *Attorney, Agent, or Firm*—George T. Marcou; Kilpatrick Stockton LLP

(57) ABSTRACT

Methods and systems for single sign-on user access to multiple web servers are provided. A user is authenticated at a first web server (e.g., by user name and password). The first web server provides a web page to the user having a service selector (e.g., a hyperlink comprising the URL of a second web server offering the service indicated by the selector). When the user activates the service selector, the first web server constructs and transmits an encrypted authentication token (e.g., a cookie) from the first web server to a second web server via the user client. The first and second web servers share a sub-domain. The authentication token comprises an expiration time and is digitally signed by the first web server and is authenticated at the second web server. Upon authentication, the second web server allows the user to conduct a session at the second web server.

38 Claims, 4 Drawing Sheets

U.S. PATENT DOCUMENTS

| | | | | |
|---|---|---|---|---|
| 6,052,785 | A | | 4/2000 | Lin et al. .................... 713/201 |
| 6,055,637 | A | | 4/2000 | Hudson et al. ............. 713/201 |
| 6,064,666 | A | | 5/2000 | Willner et al. ............. 370/352 |
| 6,067,623 | A | * | 5/2000 | Blakley et al. ............. 713/201 |
| 6,085,320 | A | | 7/2000 | Kaliski, Jr. |
| 6,092,196 | A | * | 7/2000 | Reiche ....................... 713/200 |
| 6,189,098 | B1 | | 2/2001 | Kaliski, Jr. |
| 6,249,873 | B1 | | 6/2001 | Richard et al. |
| 6,263,432 | B1 | * | 7/2001 | Sasmazel et al. ........... 713/100 |
| 6,421,768 | B1 | * | 7/2002 | Purpura ....................... 711/164 |
| 6,438,600 | B1 | * | 8/2002 | Greenfield et al. ......... 709/229 |
| 6,490,624 | B1 | * | 12/2002 | Sampson et al. ........... 709/227 |
| 6,606,663 | B1 | * | 8/2003 | Liao et al. .................. 709/229 |

FOREIGN PATENT DOCUMENTS

| | | |
|---|---|---|
| EP | 0940960 A1 | 9/1999 |
| EP | 940960 A1 * | 9/1999 |
| JP | 10269184 | 10/1998 |
| JP | 11025048 | 1/1999 |
| WO | WO 99/20060 | 4/1999 |

OTHER PUBLICATIONS

Park, Joon S., "A Secure-Cookie Recipe for Electronic Transactions" [online], *Korea Conference (UKC) on Science, Technology, Entrepreneurship, and Leadership,* Aug. 12-14, 1999 [retrieved on Feb. 21, 2002], 8 pp., Retrieved from the Internet: http://citeseer.nj.nec.com/park99securecookie.html.

Park, Joon S., "Secure Attribute Services on the Web" [online], *George Mason University*, Fairfax, Virginia, Jun. 1999 [retrieved on Feb. 21, 2002], 121 pp., Retrieved from the Internet: http://www.list.gmu.edu/dissert/diss-jean.pdf.

"Extranets Invigorate Single-Sign-On Security"; PC Week; Aug. 23, 1999.

"Through the Looking Glass-House"; HP Professional, vol. 11, No. 6; Jun. 1997.

"Cryptography Is the Key To Intranet Security Needs"; Computer Reseller News; No. 743; Jun. 30, 1997.

"Microsoft and Novell Compete In Creating Single Internet Sign-On For Your e-Shopping"; InfoWorld; Nov. 15, 1999.

"CRYPTOCard Enables Companies and ISPs to Secure Intranet Access With Authentication Tokens At Much Lower Costs"; Business Wire; Jun. 29, 1998.

Na, Z., et al., Applications of Cookie on the Internet, Computer Applications, Sep. 1998, pp. 28-31, Hu Nan, Changsha, China, Abstract.

Re: URLEncoder, Where is the URLDecoder, Apr. 29, 1996, Abstract.

* cited by examiner

METHOD AND SYSTEM FOR SINGLE SIGN-ON USER ACCESS TO MULTIPLE WEB SERVERS

I. CROSS REFERENCE TO RELATED APPLICATION

This patent application claims priority to co-pending U.S. Provisional Patent Application Ser. No. 60/155,853, entitled "Method and System for Single Sign-On User Access to a Federation of Web Servers," filed Sep. 24, 1999, which is hereby incorporated in full by reference.

II. FIELD OF THE INVENTION

The present invention relates generally to the field of electronic commerce. More particular, embodiments of the present invention relate generally to a method and system for providing single sign-on user access to multiple web servers.

III. BACKGROUND OF THE INVENTION

There are many situations in which an entity or group of entities, such as a global financial institution with banking, brokerage, and other aspects, wishes to combine the functional resources of different web application servers in order to aggregate functionality to the customers of the entity or group of entities. Such an entity or group of entities may wish to allow their customers access to such an aggregated functionality by signing on only once, by authenticating themselves once, and then being able to use different services which might be provided either by different servers of entities within the group of entities, or by servers of the group of entities and, for example, by servers of third party entities.

In this context, the entity or group of entities may wish to deliver to the customer, via a web browser, a set of services that are hosted by different web application servers. Such application servers may employ different platforms, such as a UNIX platform, an NT platform, or some other type of platform. The platform may have been constructed by different organizations within the group of entities, or the platform may have been provided by third-party providers. In any event, an essential problem is how to allow the customer to sign on once and then to redirect the customer to these different servers without requiring the customer to sign on each and every time he or she goes accesses a different server.

Conventional products attempting to address this problem are deficient, for example, both in terms of performance and cost. In some such products, it is necessary to return to a centralized resource. Other such products do not support crossing organizational boundaries or Internet domain boundaries. What is needed is a methods and system for single sign-on user access to multiple web servers, such as a federation of web servers sharing sub-domains, that overcome such disadvantages and that provide other advantages.

IV. SUMMARY OF THE INVENTION

The present invention provides methods and systems for single sign-on user access to multiple web servers, such as a federation of web servers sharing sub-domains, are provided. In an embodiment, a user is authenticated at a first web server (e.g., by user name and password). The first web server provides a web page to the user having a service selector (e.g., a hyperlink comprising the URL of a second web server offering the service indicated by the selector). Upon activation of the selector by the user, the first web server constructs, digitally signs, and transmits an encrypted authentication token (e.g., a cookie) from the first web server to a second web server via the user client. URL encoding is employed to encrypt and sign the authentication token. The first and second web servers share a sub-domain. The authentication token comprises an expiration time. The authentication token is examined and authenticated at the second web server and URL decoding is employed. Upon authentication, and if the expiration time has not passed, the second web server allows the user to conduct a session at the second web server.

In another embodiment, a method for single sign-on user access to a federation of web servers, such as a first and second web server sharing a sub-domain, is provided. In an embodiment, the method comprises allowing a user at a computing device to access a first web server in the federation of web servers via a web browser of the computing device, authenticating the user with user-provided authentication information, including at least a user identification, by the first web server, and allowing the user to conduct a session a the first web server. During the session, the first web server carries out the functions of prompting the user for selection of a functionality offered via at least a second web server, and receiving a selection by the user of the functionality offered via the second web server. Upon receiving a selection, the first web server creates an authentication token for the user including at least the user identification and with a pre-defined token expiry by the first web server, digitally signing (e.g., by public key encryption) the authentication token by the first web server. An embodiment further comprises qualifying the domain attribute of the authentication token with the shared sub-domain name by the first web server, sending the digitally signed authentication token to the web browser of the computing device by the first web server, redirecting the web browser to the second web server by the first web server, and sending the authentication token to the second web server by the web browser. The second web server decrypts the authentication token, confirms a match with the digital signature of the first web server, checks the pre-defined expiry of the authentication token by the second web server, and allows the user to conduct a session with the second web server if within the pre-defined token expiry.

In another embodiment, a method of single sign-on for multiple web servers, comprising receiving log-in data from a user in a first server, providing the user with a service selector, receiving an indication that the user selected the service selector, constructing an authentication token comprising profile data associated with the user, encrypting and signing the authentication token, redirecting the user to a second server, transmitting the authentication token to the user, receiving the authentication token in the second server, verifying the authentication token in the second server, and allowing the user access to a service provided by the second server. In one such embodiment, the authentication token comprises a cookie and further comprises expiration time data.

It is a feature and advantage of the present invention to provide a method and system for single sign-on user access to a federation of web servers that allows users already authenticated on a web site, such as a financial institution's web site, to have access, for example, to a service provider's web site without having to be re-authenticated via provision of a valid name and password.

To achieve the stated and other features and advantages, an embodiment of the present invention provides a method and system which enables single sign-on access for a user to a federation of web servers that allows user authentication at an entity's web site server, selection of a service provider URL, and passage of an authentication token by the entity's web site server to a service provider's server that contains sufficient information to enable the service provider's server, for example, to recognize the user as a valid service provider user and to provide the user with customer specific information.

Additional objects, advantages and novel features of the invention will be set forth in part in the description which follows, and in part will become more apparent to those skilled in the art upon examination of the following, or may be learned by practice of the invention.

V. BRIEF DESCRIPTION OF FIGURES

VI. DETAILED DESCRIPTION

Figure 1:
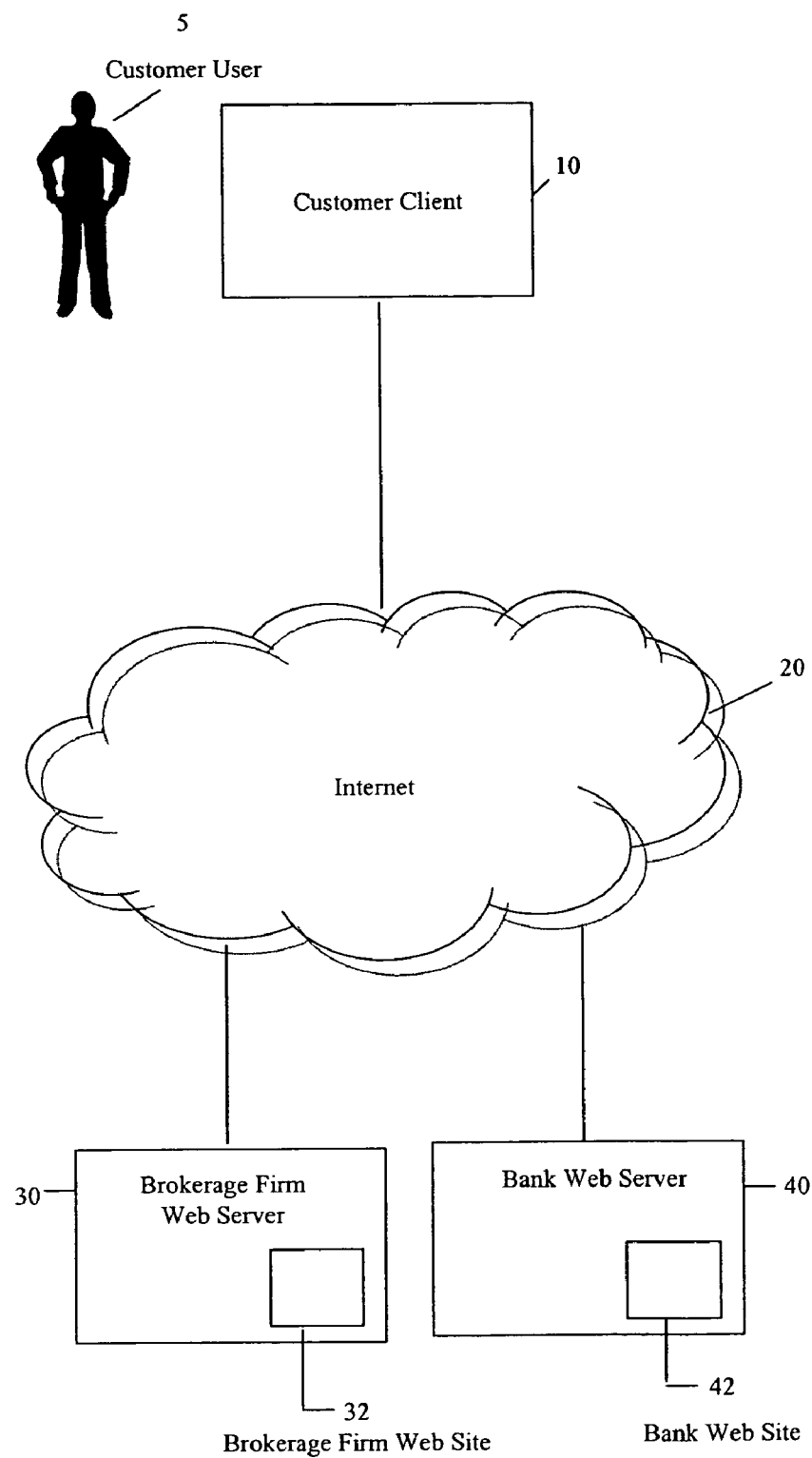
FIG. 1 shows an embodiment of a system according to the present invention.

FIG. 1 shows an embodiment of a system according to the present invention. A brokerage firm web server (BFWS) 30 includes a brokerage firm web site 32. The brokerage firm web server 30 (and likewise the brokerage firm web site 32) is in communication with the Internet 20. Likewise, a bank web server 40 includes a bank web site 42. The bank web server (BWS) 40 (and likewise the bank web site 42) is also in communication with the Internet 20. A customer 5 of both the brokerage firm and the bank is shown. The customer 5 has a user name and password to access both the brokerage firm web site 32 and the bank web site 42. The customer's personal computer 10 having a web browser such as Microsoft Internet Explorer or Netscape Navigator (a client) is in communication with the Internet 20 as well. The customer 5 uses the customer's personal computer and browser 10 to communicate with the web servers 30, 40 via the Internet. Herein, the term customer is used in many instances to indicate the client 10 as used by the customer. In addition to network communication facilities and other aspects, the brokerage firm web server 30 and the bank server 40 comprise programming to carry out the functions described herein.

Figure 2:
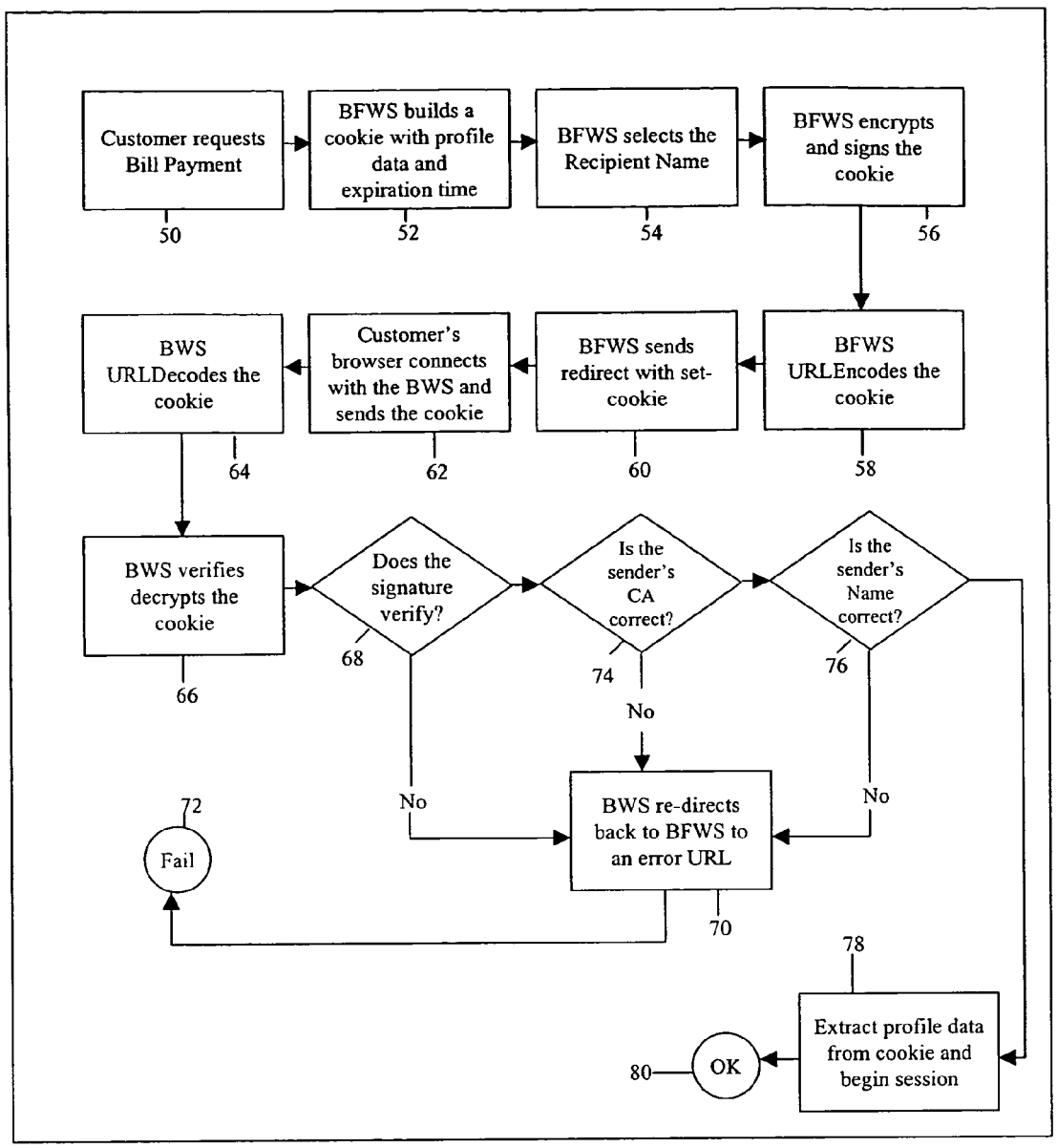
FIG. 2 shows a flow diagram describing a process according to the present invention carried out in the system shown in FIG. 1.

FIG. 2 shows a flow diagram of steps carried out in the system shown in FIG. 1. The customer 10 points the customer's browser to the brokerage firm web site 32. The customer 10 logs into the brokerage firm web site 32 using the customer's correct user name (or user identification) and password for the brokerage firm web site 32, and is authenticated by the brokerage firm web server 30. Once the customer logs into the brokerage firm web site 32, the web site 32 presents the customer 10 with a welcome page from the web site 32. Once logged in, the customer 10 may examine the customer's brokerage account information, portfolio, investment information, and the like.

Figure 3:
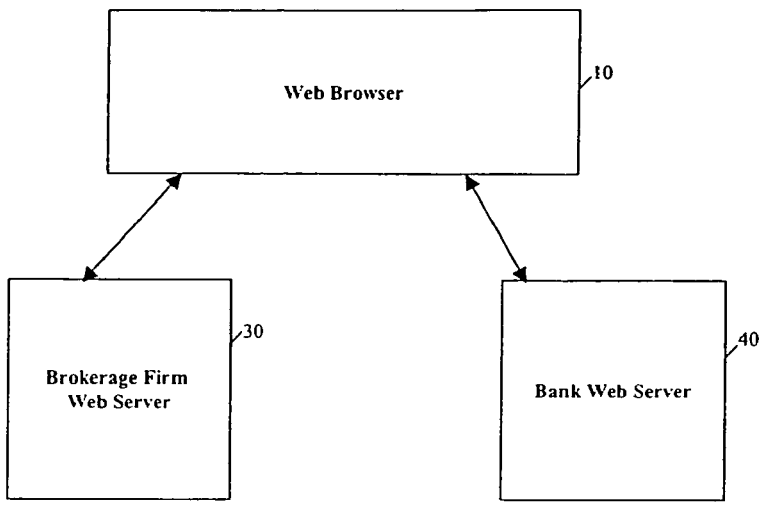
FIG. 3 shows a visual depiction of web pages associated with web servers of the system shown in FIG. 1.
Figure 3:
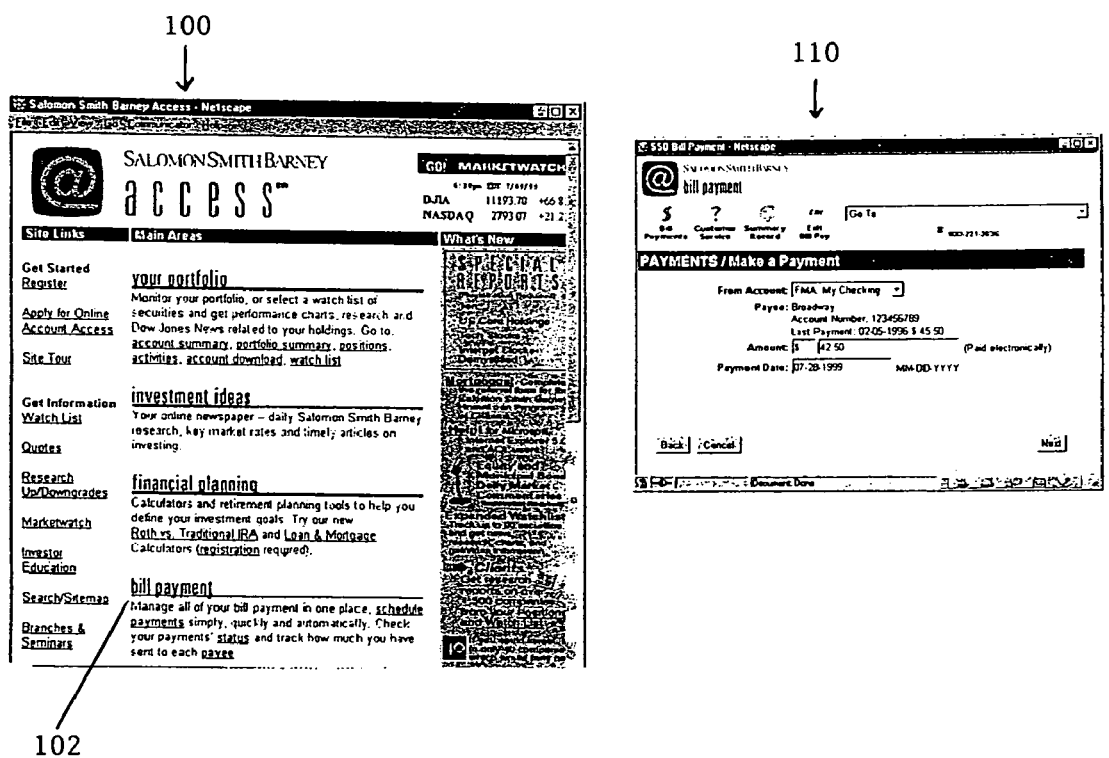

FIG. 3 shows a graphical depiction of the system shown in FIG. 1, including the welcome page 100 from the brokerage firm web site 30 provided to the customer 10 once the customer logs in at the brokerage firm web site 30. The welcome page 100 shown in FIG. 3 includes a service selector in the form of a hyperlink shown as "bill payment" 102. The brokerage web site offers its customers the ability to pay bills.

Referring again to FIG. 2, the customer 10 requests bill payment 50 by clicking on the "bill payment" hyperlink 102. The brokerage firm web server 30 itself does not handle the process of bill payment, but the server 30 is programmed with the knowledge that the bank web server 40 handles such a process. The hyperlink 102 includes the URL of the bank web site 42. Upon detecting the request of bill payment, the brokerage firm server 30 builds an authentication token 52. An authentication token comprises an object (or data) that can be passed between cooperating servers. A function of an embodiment of an authentication token is to convey the necessary information from a primary (or first) server to a secondary (or second) server to allow the secondary server to skip the sign-on process that would otherwise be necessary and required. Once a primary server establishes a session for a user, a cooperating secondary server that receives a valid authentication token from the primary server can establish a session without having the user sign on again.

In the embodiment shown in FIG. 1, the brokerage firm web server 30 builds an authentication token (or access token) comprising user identification data (or profile data) and expiration time data (token expiry) 52. The profile data comprises user identification data comprising a customer identification number that uniquely identifies the user to the secondary server. In the shown embodiment, the token also include a list of accounts of the customer. Expiration time data comprises data reflecting the time after which the authentication token is invalid. In the embodiment shown, the time is in Greenwich Mean Time (GMT). In other embodiments, the time may be in Universal Time. Expiration time may be set by the primary server at any desired time, though in most embodiments the expiration time is a relatively short time, e.g., three to twenty minutes, from the time at which the authentication token is created. In the embodiment shown, the expiration time is set at fifteen minutes from the time the authentication token is created. Note that it is important for the servers exchanging such authentication tokens to maintain correct or synchronized clocks. The use of expiration time is used to create a single-use, perishable token.

In the embodiment shown, the authentication token built comprises a cookie with profile data of the customer 5 and an expiration time of fifteen minutes from the creation time of the token. Authentication tokens may also comprise URL strings or other data that may be passed between servers. The profile data of the customer includes a customer identification number for the customer 5. The brokerage firm web server 30 includes a data storage system (e.g., a hard disk drive) that has customer identification numbers associated with log-in user names used by customer's of the brokerage firm web server 30. These numbers were agreed upon previously by the administrators of the servers 30, 40. In the embodiment shown, a customer is associated with a customer identification number. In the embodiment, when the customer requests bill payment 50, the server 30 retrieves, from the data storage system, the customer identification number for the customer 5. This customer identification number retrieved is used in the profile data used to build the cookie 52.

In another embodiment, various customer identification numbers are associated with various secondary servers. When the customer requests a service provided at a secondary site (or to be transferred to a secondary site), the primary server detects the request, determines the secondary site, and retrieves, from the data storage system, the customer identification number for the requesting customer that is associated with the secondary site to which the customer will be directed for bill payment services.

Referring again to FIG. 2, the server 30 also selects the secondary server recipient name 54. The server 30 does so by examining the request made by the customer and determining the name/address of the appropriate secondary server to handle the request. In the embodiment shown, the server 30 examines the "bill payment" request made by the customer. In the present embodiment, the examination comprises determining the Uniform Resource Locator (URL) associated with the "bill payment" hyperlink. The web page file associated with the welcome page 100 includes the URL associated with the "bill payment" hyperlink, and the server 30 selects this URL.

The server 30 then signs and encrypts the cookie 56. A digital signature associated with the brokerage firm server 30 is applied to the cookie 56 by the server 30. Preferably, the server 30 comprises public key encryption software capable of encrypting, digitally signing, and authenticating electronic transactions across applications and servers. In the embodiment shown, the Entrust/PKI 5.0 software package, with its associated application programming interface (API) library, available from Entrust Technologies, Inc., Plano, Tex., is used to sign the cookie using a public key encryption system. In the embodiment shown, the cipher used is the Triple DES (Data Encryption Standard) encryption algorithm system, the encrypted cookie uses privacy-enhanced mail (PEM) headers, and signing uses the Secure Hash Algorithm (SHA-1) to create the message digest (or hash value) in signing. The Triple DES system is used to encrypt the authentication token (the cookie), and a PEM header and SHA-1 digest is included.

A digital signature associated with the server 30 (in the form of a signed-encrypted string) applied to the cookie allows a secondary server to verify that the authentication token was created by the brokerage firm server 30. Further, the signature allows a secondary server to detect any modification or corruption of the authentication token. The digital signature is applied and encrypted by the server 30.

In the embodiment shown, the cookie is created and kept on the browser 10 of the user 5 using a header entry in the response page, and the header entry is structured as follows: Set-cookie; name=value; expires=date-time; domain=domainname; path=path; secure. The path value comprises a specific directory, and the domainname value preferably is a common sub-domain (discussed further below). In an embodiment, the authentication token (the cookie) is non-persistent and will not be written to disk on the customer client 10. In such an embodiment, an expires value is not necessary, and the cookie will be deleted by the receiving server immediately after receipt.

An example of a string comprising cookie construction according to an embodiment of the present invention is as follows:

VER|1EXPDT|199905051325401||CT\CUST|AF|EXIST|| CID|57600100056005023 4||

FCID|0||TA|2||ANM|00110000001||RTN|099||ANA|My wife's

Checking||AB|237600||ANM|0010000002||RTN009||ANA|My checking||AB|24556. The example is in the following format: Tag1 Tagvalue1 Tag2 TagValue2 Tag3 TagValue3 . . .

It is noted that the specific tags and their tag values may vary according to implementation needs, such as destination server requirements.

Tags in the example shown, their value, and a description is shown in the following table:

| Tag | Tag Value | Description |
| --- | --- | --- |
| VER | 1 | Version of cookie system being used (current version is 1) |
| EXPDT | Date/Time | The ASCII GMT date and time that the authentication token expires. Format: CCYYMMDDHHMMSS. |
| CT | CUST FC | Customer Type. CUST = regular customer. FC = Customer Representative. Used to activate view-only mode. |
| AF | NEW/EXIST | New or existing customer indicator. |
| CID | Integer | Customer Identification Number |
| FCID | Alphanumeric | Identification number for customer service representative. If the user is a regular customer, do not set FCID (i.e., set to 0). |
| TA | Integer | Total Number of Accounts of customer |
| ANM | Integer | Account Number |
| RTN | Integer | Routing transit Number-maps to prod-type-cd |
| ANA | Alphanumeric | Account nick name |
| AB | Integer | Account Balance in cents (i.e. $10.50 = 1050) |

In the embodiment shown, the order of tags is not significant, except for ANM, ANA, AB, which are considered a tuple and are grouped together as shown above. Also, in the embodiment shown, the VER, EXPDT, and CT are required tags. Other tags that may be used in other embodiments include the following: AG (agency or corporation name that employs the user), FNAM (first name of user), and LNAM (last name of user).

The AF tag allows the bank server 40 to determine if an "Activate User" message should be sent to a transaction processing system (TPS). Preferably, if the brokerage firm web server 30 cannot determine whether a customer is new or already enrolled with GTPS, the server 30 sets the AF tag to NEW. In addition, the brokerage firm web server 30 shown assumes that all accounts are of the "Checking" type, and will set the product type code based on the RTN value determined.

The brokerage firm server 30 then URL encodes (also called URLEncode) the constructed cookie 58. Essentially, in URL encoding the cookie, the broker firm web server converts the formatted string discussed above to a URL-encoded format. In one embodiment, the URL encoding encodes the string using the URL escape syntax which comprises a three character string (% nn) specifying the hexadecimal code for a character. This syntax is used to hide characters that may be otherwise significant when used in a URL. The URL encoding 58 carried out by the brokerage firm web server 30 results in an encoded, signed, and encrypted string suitable for writing in a cookie, and such string is included in the cookie built by the server 30.

The brokerage firm web server 30 then sends a redirect command (or redirect page) with the URL encoded cookie (the authentication token) in a set-cookie header to the customer client 60. The redirect command includes the URL of the web site associated with "bill payment" 42. The customer client 10 receives the redirect command and the URL encoded cookie constructed by the brokerage web server 30.

The customer client 10 connects with the bank web site 42 via the Internet 20 and sends the cookie to the bank web server 62. In the embodiment shown, the authentication token is transmitted in a Secure Sockets Layer (SSL) session. Further, in the embodiment shown, on receipt of the redirect command, the customer client 10 opens a second browser window, requests a download of the home page at the URL of the web site 42 (or the page designated in the URL), receives the page of the web site 42 from the bank web server 40, and displays the page in the window. An embodiment of such a window 110 and page is shown in FIG. 3. The cookie received by the customer client 10 from the brokerage firm web server 30 is sent by the customer client 10 to the bank web server 40.

The bank web server 40 receives the cookie from the customer client 10. The bank web server 40 decodes the encoded, signed, and encrypted string built into the cookie by the brokerage firm web server 30 into a signed, encrypted string 64. Such decoding employs URL Decoding (or URL-Decode) methods in the embodiment shown. In the embodiment shown, URL Decoding is employed to convert the URL encoded string in the cookie to plain ASCII for examination by the bank web server 40. The bank web server 40 and the brokerage firm web server 30 previously exchanged public-private key decryption information.

Once the string is decoded, the bank web server 40 decrypts and verifies the cookie (including the signed, encrypted string that is now decoded) 66. In the embodiment shown, software comprising public key encryption software capable of decrypting and authenticating electronic transactions across applications and servers is used by the bank web server 40 to do so. One example of such software is the Entrust/PKI 5.0 software package, with its associated application programming interface (API) library, available from Entrust Technologies, Inc., Plano, Tex.

The bank web server 40, using the software mentioned, determines whether the digital signature associated with the cookie verifies 68. If the signature does not verify, the bank web server 40 rejects the attempted sign-on and re-directs the customer client 10 to a web page on the brokerage firm web server 30 indicating an error and sign-on failure 70, resulting in a failed sign-on attempt 72. In another embodiment, if the signature does not verify, the bank web server 40 rejects the sign-on and sends a web page indicating an error and sign-on failure to the customer client 10. In an embodiment, if the signature does not verify, the bank web server 40 also sends a message indicating such failure to the brokerage firm web site 30, e.g., an e-mail message.

If the signature verifies, the bank web server 40 examines the Certificate Authority (CA) name associated with the cookie 74. The server 40 compares the CA name associated with the cookie (i.e., the CA used with the CA name expected, as recorded in a registry file in the bank web server 40). If the CA name is not the one expected, the bank web server 40 re-directs the customer client 10 to an error page on the brokerage firm web server 70 and the sign-on attempt fails 72, as described above.

If the CA name is the CA name expected, the bank web server 30 next if the sender's name is correct 76. In doing so, the bank web server 30 determines whether the Common Name (CN) associated with the cookie (i.e., the name being certified—the name used by the brokerage firm web server 30) is an authorized name. In so determining, the bank web server 40 compares the CN associated with the cookie with a file containing authorized names in a data registry in the bank web server 40. If the CN is not the one expected, the bank web server 40 re-directs the customer client 10 to an error page on the brokerage firm web server 70 and the sign-on attempt fails 72, as described above.

If the CN is correct, i.e., if the CN is an authorized name, the bank web server 40 extracts profile data from the cookie and begins a bill-payment session 78. In the embodiment shown, the server 40 parses the clear text data associated with the cookie (clear text refers to the information that is not encrypted) 78, and examines the expiration time data in the cookie (not shown). If the expiration time has passed, the bank web server 40 re-directs the customer client 10 to an error page on the brokerage firm web server 70 and the sign-on attempt fails 72, as described above. The clear text data includes profile data (e.g., customer identification number). If the expiration time has not passed, the web server 40 begins a bill payment session using the session and profile data 78 by sending the customer client the web page 110 of the bank web site 42 that is shown in FIG. 3, and the sign-on is successful 80. The customer client 10 receives the web page 100 and proceeds with the bill-payment session with the bank server 40. In an embodiment, the authentication token (cookie) is then discarded or destroyed by the web server 40.

Figure 4:
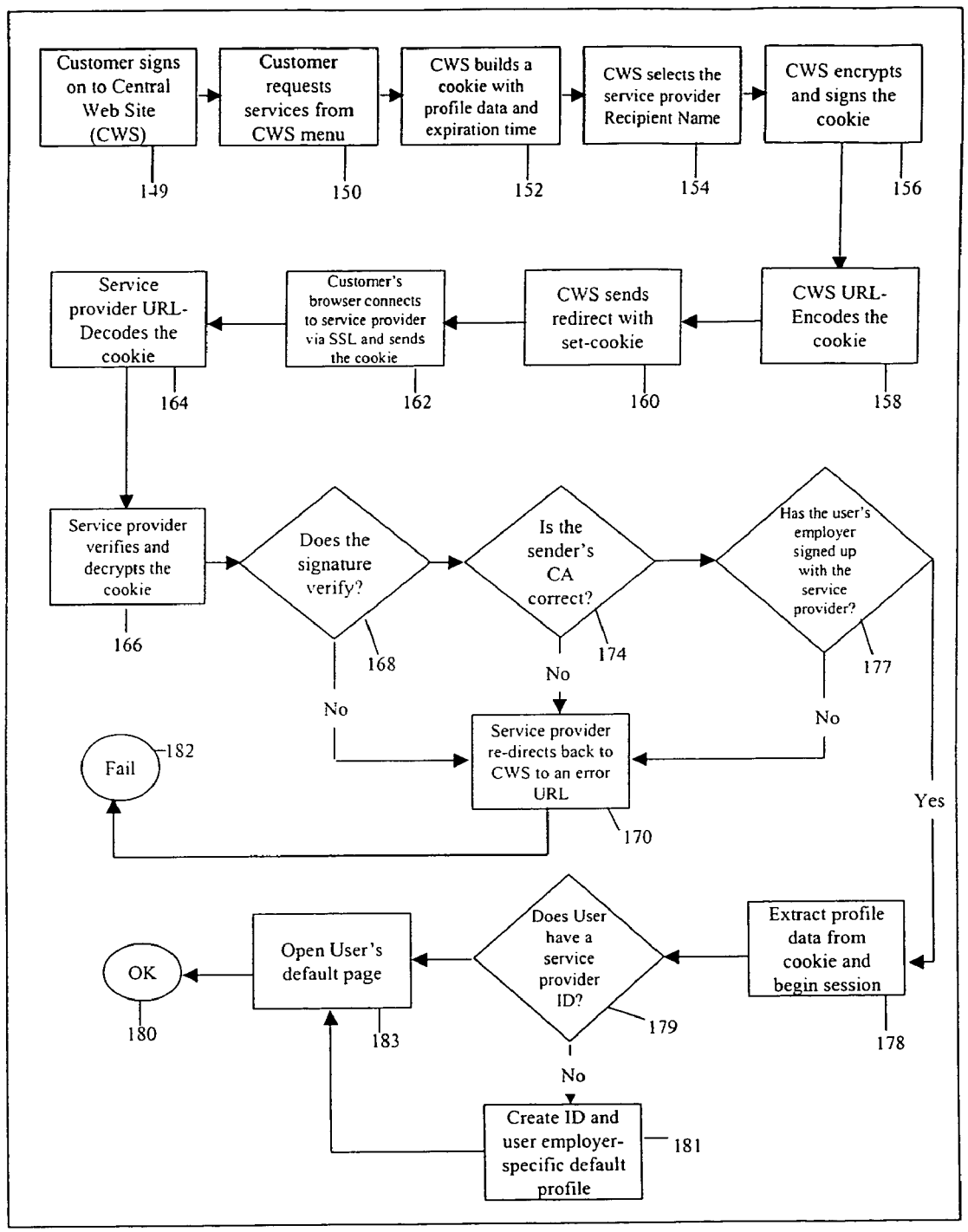
FIG. 4 shows a flow diagram describing an alternative process according to the present invention carried out in the system shown in FIG. 1.

In an alternative embodiment, the system reflects a service associated with a user's employee. One such embodiment is shown in FIG. 4. In the embodiment shown in FIG. 4, the process of this alternative embodiment generally proceeds as that discussed above, with exceptions discussed below. The embodiment shown employs a primary server comprising a central web server having a central web site (not shown). The central web site comprises a web site at which the customer client 10 may request various services by clicking a hyperlink.

Referring to FIG. 4, the customer 5 signs on to the central web site 149, and the process 150, 152, 154, 156, 158, 160, 162, 164, 166, 168, 170, 174, continues in a manner like that described above in relation to steps 50, 52, 54, 56, 58, 60, 62, 64, 66, 68, 70, 74 shown FIG. 3, with the central web server serving as the primary server (the brokerage web server served as the primary web server in the embodiment shown in FIG. 2) until the step shown as item 177 occurs. The primary server includes the following, additional tags in the cookie: AG (agency or corporation name that employs the user), FNAM (first name of user), and LNAM (last name of user). The service provider referred to in FIG. 4 comprises the secondary server, and in the embodiment shown comprises the bank web server 40. After the bank web server 40 determines that the sender's CA is correct, the web server 40 determines whether the customer/user's employer has signed up with the service provider associated with the secondary server (the bank web server 40) 177. The bank web server 40 includes a database containing a list of employers who signed up with the service offered by the bank web server 40. The web server 40 compares the agency or corporation name in the AG tag with the list of employers. If the name in the AG tag is not on the list, the web server 40 re-directs the customer client 10 back to the central web site for an error URL 170.

If the name in the AG tag is on the list, the web server 40 continues the process by extracting profile data from the cookie and beginning a bill-payment session 78. After the bank web server 40 extracts profile data from the cookie and begins a bill-payment session 78, the server 40 examines a database (not shown) associated with the server 40 that includes data reflecting users who have previously signed up for or used the service provided by the server 40. If the user reflected by the cookie exists (i.e., has previously signed up for or used the service provided by the server 40), the web server 40 retrieves a default web page previously selected as the user's default page and sends the default web page to the customer client 183, and the customer client 10 then may proceed with a bill-payment session 180.

If the user reflected by the cookie does not exist (i.e., the database does not reflect that the user has previously signed up for or used the service provided by the server 40) at 179, the web server 40 creates a user identification using the tag information, including the AG, FNAM, and LNAM tag information at 181, and stores the user identification in a database. The server 40 then retrieves a pre-designated default web page and transmits the web page to the customer client 183. The pre-designated default web page comprises a pre-designated web page for users associated with the agency/corporation indicated in the AG tag. The customer client 10 then may proceed with a bill-payment session 180.

In an embodiment, multiple secondary servers are used in an embodiment of the present invention. In still other embodiments, multiple primary servers are used. A group of one or more primary and one or more secondary servers sharing log-in and other information as described herein may be referred to as a "federation" of servers.

In the embodiments shown herein, a digital certificate generation software program is used to generate certificates. An example of such software is the Entrust Solo Version 4.0 software package, available from Entrust Technologies, Inc., Plano, Tex. Preferably, when multiple secondary servers are employed in an embodiment of the present invention, the secondary servers will use the same profile (a file comprising information needed by the certificate before the server can authenticate). Also, preferably, the CN name in the profile matches the generic host name of the secondary server.

In embodiments, multiple primary servers are employed. The primary servers may use the same profile on all hosts or each host may use a separate profile. Like the secondary servers, certificates are employed in each primary server.

In an embodiment, servers sharing information between themselves that are maintained by different organizations use a shared domain in common in order to ease the sharing of information. In such an embodiment, a sub-domain is established or designated as the common sub-domain, the domain attribute of the authentication token (e.g., the shared cookie) is designated as the common sub-domain, and a "Forward IP (Internet Protocol) Pointer" entry is added in the DNS name servers of the cooperating organizations.

For example, the primary server sets a cookie sub-domain of xxxx.yyyy.com (wherein yyyy.com comprises the domain name of the primary server). Using "tail matching," cookies may be shared with any host whose domain tail is "yyyy.com." When the server searches a cookie list on the user's computer for valid or useable cookies, the server compares the domain attributes of the cookie with the Internet domain name of the host. If there is a tail match, then the cookie will go through path matching to see if it should be sent. "Tail matching" means that domain attribute is matched against the tail of the fully qualified domain name of the host. For example, a domain attribute of "xxxx.com" would match host names "yyyy.xxxx.com" as well as "zzzz.yyyy.xxxx-.com." For example, the primary server with which the user interacts has a domain name of qqqq.yyyy.com, and the secondary server has a domain name of ssss.rrrr.yyyy.com, may share cookies in such an embodiment. In an embodiment, the IP pointer in the domain name server associated with the primary server either (1) maps the secondary server domain (ssss.rrrr.yyyy.com) to a pre-designated IP address associated with the secondary server; or (2) delegate the zone "rrrr" to a DNS name server associated with the secondary server for resolution.

As discussed above, certain embodiments of the present invention employ URL Encode and URL Decode. The following is a code fragment written in Microsoft C++6.0 showing an example of the implementation of URL Encode by a server:

```
//
// URLEncode converts some characters to %xx format for sending
// in a URL or writing to a cookie
//
void URLEncode (BYTE* szDecoded, BYTE* szEncoded)
    {
        BYTE* pszInPtr = szDecoded;
        BYTE* pszOutPtr = szEncoded;
        BYTE inch;
        while ((inch = *pszInPtr++) != '\0')
        {
            if(   (inch < 32) ||      (inch > 127) ||
                  (inch == '=') ||    (inch == '?') ||
                  (inch == '&') ||    (inch == '+') ||
                  (inch == '%') ||    (inch == '–') ||
                  (inch == ':') ||    (inch == ';') ||
                  (inch == ','))
            {
                *pszOutPtr++ = '%';
                sprintf((char*)pszOutPtr, "%02x", inch);
                pszOutPtr += 2;
            }
            else
                *pszOutPtr++ = inch;
        }
        *pszOutPtr++ = '\0';;
    }
```

The following code fragment shows the implementation of URL-Decode by as server:

```
//
// URLDecode converts characters in the %xx format back to their ascii values
//
void    URLDecode (BYTE* szEncoded, BYTE* szDecoded)
    {
        BYTE* pszInPtr = szEncoded;
        BYTE* pszOutPtr = szDecoded;
        int    inch;
        while ((inch = *pszIntPtr++)     != '\0')
        {
          if (inch == '%')
                  *pszOutPtr++ = (unHex(pszInPtr++)<< 4) +
                          unHex(*pszInPtr++);
          else
                  *pszOutPtr++ = inch;
        }
        *pszOutPtr++ = '\0';
    }
int unHex (BYTE hexChar)
    {
        if ((hexChar >>= '0') && (hexChar <= '9'))
            return hexChar – '0';
        if ((hexChar >= 'a') && (hexChar <= 'f'))
            return hexChar – 'a' + 10;
```

-continued

```
    if ((hexChar >= 'A') && (hexChar <= 'F'))
        return hexChar - 'A' + 10;
    return 0;
}
```

Those of ordinary skill in the art will recognize that there are a variety of code fragments useful in carrying out such steps. Further, a variety of programming languages may be used.

Various embodiments of the invention have been described in fulfillment of the various objects of the invention. It should be recognized that these embodiments are merely illustrative of the principles of the present invention. Numerous modifications and adaptations thereof will be apparent to those skilled in the art without departing from the spirit and scope of the present invention.

The invention claimed is:

1. A computer-implemented method of single sign-on user access to multiple web servers, comprising:
    authenticating a user by a first web server, the first web server also providing a first type of service session functionality for the user in addition to and different from authenticating the user, creating an encrypted authentication token, and redirecting a web browser of the user to transmit the encrypted authentication token, which first type of service session functionality is also different from a second type of service session functionality provided for the user by a second web server that is not provided by the first web server, which second type of service session functionality is also in addition to and different from authenticating the user, creating an encrypted authentication token and redirecting a web browser of the user to transmit the encrypted authentication token, each of said web servers containing information identifying the type of service session functionality provided by the other of said web servers and an address for the other of said web servers;
    detecting a client request for the second type of service session functionality for the user at said first web server that is not provided by the first web server, said first web server, for determining the second web server providing the second type of service session functionality for the user and in response thereto creating an encrypted authentication token related to the user and redirecting a web browser of the user to the second web server;
    transmitting the encrypted token from the first web server to the second web server via the user's web browser, wherein the authentication token comprises an expiration time and is digitally signed by the first web server;
    authenticating the authentication token by the second web server; and
    providing the second type of service session functionality for the user to conduct a session by the second web server.

2. The method of claim 1 wherein the first web server and the second web server share a sub-domain.

3. The method of claim 2 further comprising examining the expiration time of the authentication token at the second web server and allowing the user to conduct a session at the second web server only if the expiration time has not passed.

4. The method of claim 3 wherein the authentication token comprises a cookie.

5. The method of claim 4 wherein transmitting the encrypted authentication token from the first web server to the second web server comprises transmitting the encrypted authentication token from the first web server to the user, and then from the user to the second web server.

6. The method of claim 5 wherein authenticating the user at the first web server comprises receiving a user name and password.

7. The method of claim 6 wherein transmitting the encrypted authentication token from the first web server to a second web server comprises transmitting the authentication token from the first web server to a computer of the user; and transmitting the authentication token from the computer of the user to the second web server.

8. The method of claim 7 wherein the first web server and the second web server comprise a federation of web servers.

9. The method of claim 8 wherein authenticating the authentication token at the second web server comprises examining the cookie.

10. The method of claim 9 further comprising URL encoding the authentication token.

11. The method of claim 10 further comprising URL decoding the authentication token at the second web server.

12. The method of claim 11 further comprising providing a web page to the user having a service selector.

13. The method of claim 12 wherein the service selector comprises a hyperlink.

14. The method of claim 13 wherein the hyperlink comprises a URL for the second web server.

15. The method of claim 7, further comprising:
    sending the digitally signed authentication token to the web browser of the computing device by the first web server; and
    sending the authentication token to the second web server by the web browser.

16. The method of claim 15 further comprising allowing the user to conduct a session with the first web server.

17. The method of claim 16 wherein the second web server shares a sub-domain with the first web server.

18. The method of claim 17 further comprising digitally signing the authentication token using public key encryption.

19. The method of claim 18 further comprising confirming a match with the digital signature.

20. A system for single sign-on user access to multiple web servers, comprising:
    a means for authenticating a user by a first web server, the first web server also providing a first type of service session functionality for the user in addition to and different from authenticating the user, creating an encrypted authentication token, and redirecting a web browser of the user to transmit the encrypted authentication token, which first type of service session functionality is also different from a second type of service session functionality provided for the user by a second web server that is not provided by the first web server, which second type of service session functionality is also in addition to and different from authenticating the user, creating an encrypted authentication token and redirecting a web browser of the user to transmit the encrypted authentication token, each of said web servers containing information identifying the type of service session functionality provided by the other of said web servers and an address for the other of said web servers;
    means for detecting a client request for the second type of service session functionality for the user at said first web server, said first web server that is not provided by the first web server, said first web server, for determining the second web server providing the second type of service session functionality for the user and in response thereto creating an encrypted authentication token related to the user and redirecting a web browser of the user to the second web server;

a means for transmitting the encrypted token from the first web server to the second web server via the user's web browser, wherein the authentication token comprises an expiration time and is digitally signed by the first web server;

a means for authenticating the authentication token at the second web server; and a means for providing the second type of service session functionality for the user to conduct a session by the second web server.

21. The system of claim 20 wherein the first web server and the second web server share a sub-domain.

22. The system of claim 21 further comprising a means for examining the expiration time of the authentication token at the second web server.

23. The system of claim 22 wherein the authentication token comprises a cookie.

24. The system of claim 23 wherein the means for transmitting the encrypted authentication token from the first web server to the second web server comprises means for transmitting the encrypted authentication token from the first web server to the user, and then from the user to the second web server.

25. The system of claim 24 wherein the means for authenticating the user at the first web server comprises means for receiving a user name and password.

26. The system of claim 25 wherein the means for transmitting the encrypted authentication token from the first web server to a second web server comprises means for transmitting the authentication token from the first web server to a computer of the user and means for transmitting the authentication token from the computer of the user to the second web server.

27. The system of claim 26 wherein the first web server and the second web server comprise a federation of web servers.

28. The system of claim 27 wherein the means for authenticating the authentication token at the second web server comprises means for examining the cookie.

29. The system of claim 28 further comprising a means for URL encoding the authentication token.

30. The system of claim 29 further comprising a means for URL decoding the authentication token at the second web server.

31. The system of claim 30 further comprising a means for providing a web page to the user having a service selector.

32. The system of claim 31 wherein the service selector comprises a hyperlink.

33. The system of claim 32 wherein the hyperlink comprises a URL for the second web server.

34. The system of claim 20, further comprising:

a means for sending the digitally signed authentication token to the web browser of the computing device by the first web server; and a means for sending the authentication token to the second web server by the web browser.

35. The system of claim 34 further comprising a means for allowing the user to conduct a session with the first web server.

36. The system of claim 35 wherein the second web server shares a sub-domain with the first web server.

37. The system of claim 36 further comprising means for digitally signing the authentication token using public key encryption.

38. The system of claim 37 further comprising a means for confirming a match with the digital signature.

* * * * *